United States Patent [19]

Kudo et al.

[11] 4,405,937
[45] Sep. 20, 1983

[54] CHROMINANCE SIGNAL REPRODUCING APPARATUS

[75] Inventors: Mitsuru Kudo; Isao Nakagawa, both of Katsuta, Japan

[73] Assignee: Hitachi, Ltd., Tokyo, Japan

[21] Appl. No.: 274,275

[22] Filed: Jun. 16, 1981

[30] Foreign Application Priority Data

Jul. 4, 1980 [JP] Japan .................................. 55-90646

[51] Int. Cl.³ ........................ H04N 5/93; H04N 9/493
[52] U.S. Cl. ....................................... 358/40; 358/327
[58] Field of Search ..................... 358/40, 4, 8, 12, 31

[56] References Cited

U.S. PATENT DOCUMENTS 3,974,520  8/1976  Kuroyanagi ............................ 358/8
4,100,567  7/1978  Yoshinaka ............................... 358/8

OTHER PUBLICATIONS

New Chrominance Signal Processing LSI for Home VCR, by Nakagawa, et. al., IEEE Transactions on Consumer Electronics, vol. CE-26, Aug. 1980, pp. 315-322.

Primary Examiner—Tommy P. Chin
Attorney, Agent, or Firm—Antonelli, Terry & Wands

[57] ABSTRACT

A chrominance signal reproducing apparatus is proposed, in which an oscillation frequency of a first voltage-controlled oscillator is controlled by each of the error control voltages produced from APC and AFC circuits and the signal having the frequency component of the $\frac{1}{4}$ output frequency of the first VCO and the output frequency signal of a second VCO are added to produce a sum frequency, which is used to frequency-convert a low-frequency converted carrier chrominance signal to a carrier chrominance signal before low-frequency conversion. The AFC circuit operates only when the frequency $F'_{sc}$ of the carrier chrominance signal before the low-frequency conversion is deviated $\frac{1}{8} f_H$ ($f_H$: horizontal synchronizing frequency) or above with respect to the carrier chrominance frequency $f_{sc}$, so as to apply the control voltage to the first VCO thereby to drive the deviation within the range of $\pm \frac{1}{8} f_H$. When the $f'_{sc}$ is in the range of $f_{sc} - \frac{1}{8} f_H < f'_{sc} < f_{sc} + \frac{1}{8} f_H$, the APC circuit controls the first VCO so that $f'_{sc} = f_{sc}$.

7 Claims, 16 Drawing Figures

CHROMINANCE SIGNAL REPRODUCING APPARATUS

BACKGROUND OF THE INVENTION

This invention relates to chrominance signal reproducing apparatus for use in a reproducing system such as a video tape recoder (hereinafter, referred to as VTR), or the like.

FIG. 1 shows a typical example of a conventional chrominance signal reproducing apparatus for color VTR.

The operation of the apparatus of FIG. 1 upon reproduction will be described. Upon reproduction, a reproduced signal output from a pre-amplifier (not shown) is applied via a terminal 1 to a low-pass filter (hereinafter referred to as LPF) 5, where a low-frequency converted signal is separated from an FM modulated signal. The signal from the LPF 5 is applied to a chrominance signal gain automatic control (hereinafter abbreviated ACC) circuit 6. The low-frequency converted chrominance signal, the signal amplitude of which is made constant at the ACC circuit 6, is applied to a main frequency converter 7 together with a frequency converting signal from a band-pass filter 14. The frequency converted components from the frequency converter 7 are applied to a first band-pass filter (hereinafter, abbreviated BPF) 8 with its center frequency being the difference-component frequency, where the difference component frequency is separated as a chrominance signal f'sc before low-frequency conversion.

This chrominance signal f'sc is applied via an output terminal 4 to a mixer (not shown) for mixing with the reproduced luminance signal and so on, to appear as a reproduced video signal. However, the reproduced carrier chrominance signal includes a time-base variation $\Delta f$ due to the irregular tape drive speed of the tape driving system. Thus, at the reproducing step, in case of converting the low-frequency converted carrier chrominance signal to the carrier chrominance signal before low-frequency conversion, an automatic frequency control circuit (hereinafter, abbreviated AFC circuit) and an automatic phase control circuit (hereinafter, abbreviated APC circuit) are provided as correction circuits for compensating for the time-base variation. These correction circuits control two variable frequency oscillators for allowing the output of a sub converter to be applied as a frequency converting signal to the main converter 7 and thereby allow the sub converter to generate the frequency converting signal for canceling the time-base variation. The AFC circuit is a correction circuit using the phase information of horizontal synchronizing signals, and comprises a phase comparator 15, a 160 $f_H$ VCO 16 ($f_H$: horizontal synchronizing frequency) which is a voltage-controlled oscillator for generating 160 $f_H$ as a reference frequency, a ¼-frequency divider 17 and a 1/40-frequency divider 18. The phase comparator 15 compares the phase of the reproduced horizontal synchronizing signal f'$_H$ from an input terminal 2 and the phase of 1/160 the output of the VCO 16 or $f_H$ thereby to control the VCO 16 by the application of the error voltage corresponding to the phase difference thereto. The output of the VCO 16 is divided in frequency by 4 at the frequency divider 17 and then applied to a phase shifter 19 as a signal having a frequency of 40 $f_H + \Delta f'$ ($\Delta f'$: time-base variation). The phase shifter 19 is responsive to a signal obtained by reproducing a vertical synchronizing signal recorded on a magnetic tape from a terminal 3 to advance the phase of the 40 $f_H + \Delta f'$ signal by 90° at each H (H: horizontal scanning period) when one of two tracks recorded on the tape is reproduced, or delay it by 90° at each H when the other track is reproduced, in the NTSC system. In the PAL system, the phase shifter 19 is responsive thereto to delay the phase of the 40 $f_H + \Delta f'$ signal by 90° at each scanning period when one of two tracks is reproduced. Thus, the phase-shifted signal is then applied to the sub converter 13.

The APC circuit comprises a burst gate circuit 9, a crystal oscillator 11 for producing a signal of the same frequency as the carrier chrominance frequency $f_{sc}$, a phase comparator 10, and a VCO 12. The burst gate 9 is responsive to the reproduced synchronizing signal applied via a low-pass filter (LPF) 20 to extract the color burst signal from the reproduced chrominance signal which has been reconverted to the chrominance signal before the low-frequency conversion. Then, the phase comparator 10 compares the reference signal (chrominance carrier frequency) from the crystal oscillator 11 and the color burst signal to supply an error voltage corresponding to the phase difference for correcting the time base variation in the carrier chrominance signal, to the VCO 12 thereby controlling the oscillation frequency of the VCO 12.

Consequently, the VCO 12 produces a signal having a frequency of $f_{sc} + \Delta f''$ ($\Delta f''$: time-base variation) and supplies it to the sub converter 13. The sub converter 13 produces the difference and sum components of the outputs from the VCO 12 and phase shifter 19, of which the sum component ($f_{sc} + 40f_H + \Delta f$, where $\Delta f = \Delta f' + \Delta f''$) is taken out by the band-pass filter (BPF) 14 and then applied to the main converter 7 as the frequency converting signal. Therefore, the difference component of the outputs of the main converter 7, or the output of the BPF 8 has the time-base variation $\Delta f$ removed. However, with this arrangement, the two correcting circuits (AFC and APC circuits) always operate separately. In other words, in the AFC circuit, the output of the VCO 16 is always controlled while in the APC circuit the output of the VCO 12 is always controlled. Since the two circuits have different response speeds to the phase variation, the control system sometimes becomes unstable, losing correct and stable chrominance reproduction. Moreover, in the long time mode, in the luminance signal processing system, a complex signal processing is performed for improvement of S/N ratio and so on and also nonlinear processing is carried out. Thus, the waveform of the video signal may cause the waveform of the horizontal synchronizing signal in the reproduced luminance signal to change, changing the phase of the horizontal synchronizing signal separated from the reproduced luminance signal. The result is that this phase change is also transmitted to the 160 $f_H$ VCO, and then via the sub and main converters to the chrominance signal. This phase change is generally not absorbed enough in the APC system loop, and eventually the luminance signal adds the phase error to the chrominance signal to spoil correct color reproduction.

SUMMARY OF THE INVENTION

It is an object of this invention to obviate the drawbacks of the prior art as set forth above and to provide a chrominance signal reproducing apparatus compatible with both the NTSC and PAL systems.

In order to achieve such objects of this invention, an oscillation frequency of a first voltage-controlled oscillator is controlled by each of the error control voltages produced from the APC and AFC circuits and the signal having the frequency component of the ¼ output frequency of the first VCO and the output frequency signal of the second VCO are added to produce a sum frequency, which is used to frequency-convert the low-frequency converted carrier chrominance signal to a carrier chrominance signal before low-frequency conversion. The AFC circuit operates only when the frequency $f'_{sc}$ of the carrier chrominance signal before the low-frequency conversion is deviated $\frac{1}{8} f_H$ ($f_H$: horizontal synchronizing frequency) or above with respect to the carrier chrominance frequency $f_{sc}$, so as to apply the control voltage to the first VCO thereby to drive the deviation within the range of $\pm \frac{1}{8} f_H$. When the $f'_{sc}$ is in the range of $f_{sc} - \frac{1}{8} f_H < f'_{sc} < f_{sc} + \frac{1}{8} f_H$, the APC circuit controls the first VCO so that $f'_{sc} = f_{sc}$.

DESCRIPTION OF THE PREFERRED EMBODIMENT

Figure 1:
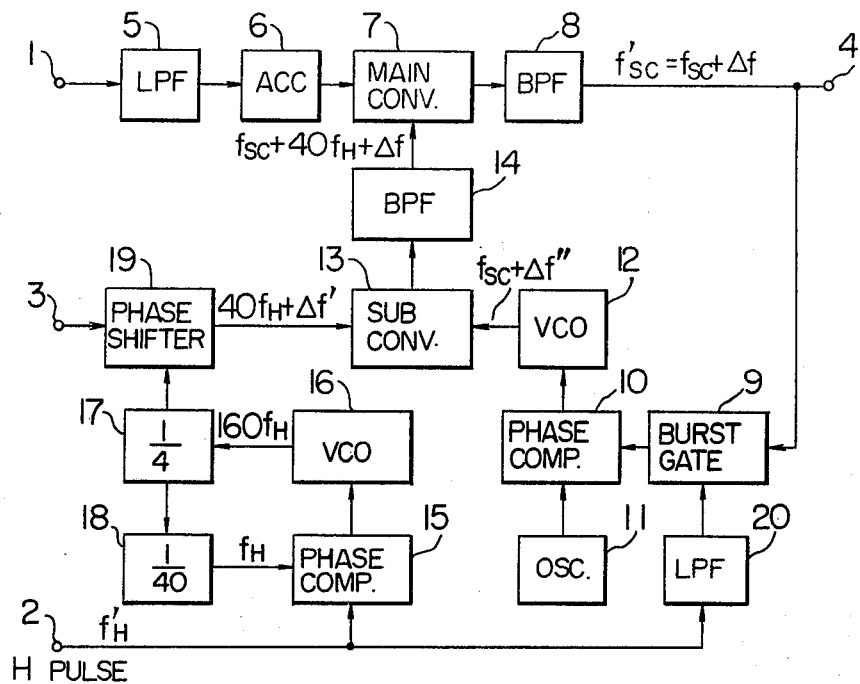
FIG. 1 is a block diagram of a typical example of the conventional chrominance signal reproducing apparatus for color VTR.

The basic principle of this invention will first be described before an embodiment of this invention is explained.

The present inventors paid their attention to the following points in order to obviate the drawbacks of the conventional apparatus.

In the NTSC system, since the phase comparator (which corresponds to the comparator 10 in FIG. 1) of the APC circuit is intermittently performed with the period of 1H (a horizontal scanning line), there exist stable points of the loop at intervals of $\pm f_H$ about the chrominance carrier frequency $f_{sc}$, and thus the pull-in range is only $\pm \frac{1}{2} f_H$. In the PAL system, since the two-phase quodrature modulation is utilized in which the R-Y component of the carrier chrominance signal is reversed in phase at every scanning line, there exist stable points of the loop at intervals of $\pm \frac{1}{2} f_H$ and thus the pull-in range is only $\pm \frac{1}{4} f_H$ in principle. Therefore, in the PAL system, there is no ability of pull-in for the deviation of $\pm \frac{1}{4} f_H$ or above from $f_{sc}$ and the side-lock is caused at points other than $f_{sc}$. Thus, a frequency discriminator is required which permits the AFC circuit to confine the frequency deviation from the $f_{sc}$ to within $\pm \frac{1}{4} f_H$ and the APC circuit to control it within the range of $\pm \frac{1}{4} f_H$, for both the NTSC and PAL systems. In other words, since the deviation width, $\pm \frac{1}{4} f_H$ relative to $f_{sc}$, of the operation region in the frequency discriminator will correspond to $$\pm \frac{1}{4} f_H \times 4 = \pm f_H$$

if it is converted viewing from the output frequency of 160 $f_H$ VCO, the frequency discriminator must be operated when the output frequency $f_o$ of 160 $f_H$ VCO exceeds $(160+1) f_H$ and is lower than $(160-1) f_H$. However, the frequency discriminator operates irregularly due to the delay time of the gates since it is formed by digital circuits. Thus, it is necessary to widen the operation region of the frequency discriminator for the margin. According to this invention, in the PAL system, the operation margin of the frequency discriminator is provided at $\pm \frac{1}{2} f_H$ so that the output frequency $f_o$ of 160 $f_H$ VCO is confined within $(160 \pm \frac{1}{2}) f_H$. Thus, for the NTSC system the margin is provided at $\pm 3/2 f_H$. The $\frac{1}{2} f_H$ corresponds to two pulses when the output pulse of 160 $f_H$ VCO is counted for the period of 4H: when $f_o$ is 160 $f_H$, the number of output pulses of 160 $f_H$ VCO during the period of 4H is $160 \times 4 = 640$. Thus, when the number of pulses during the period of 4H is 638 or below or 642 or above, the frequency discriminator produces a control voltage, and the control sensitivity for $f_o$ is stable with the best response speed. That is, the pull-in range where the counting period becomes longer than 4H can be narrowed and the operation margin can be increased. However, the response speed of $f_o$ decreases the more and the internal circuit is complicated so that when it is integrated, the number of internal elements increases. When the count period is shorter than 4H, for example, 3H, the number of pulses to be counted is $(480 \pm 1.5)$ for driving in $(160 \pm \frac{1}{2}) f_H$ and thus the discrimination is impossible. When the count period is 2H, the frequency discriminator becomes unstable in its operation because miscounting occurs due to non-uniform delay times of digital elements, causing the $f_o$ of 160 $f_H$ VCO to be side-locked. Therefore, the optimum count period is 4H. Moreover, a dead-zone is provided in the operation region of the frequency discriminator within the interval of $(160 - \frac{1}{2}) f_H < f_o < (160 + \frac{1}{2}) f_H$ so that, out of this interval, the 160 $f_H$ VCO is mainly controlled by the frequency discriminator and in this dead-zone it is controlled by only the APC circuit. Thus, in the range in which the loop can stably be operated by only the control output of the APC system, the loop is prevented from being disturbed to be unstable by an output from the discriminator, if present. Furthermore, the frequency discriminator and APC system control a common VCO, or 160 $f_H$ VCO to present the stability of the loop from being lost.

Figure 2:
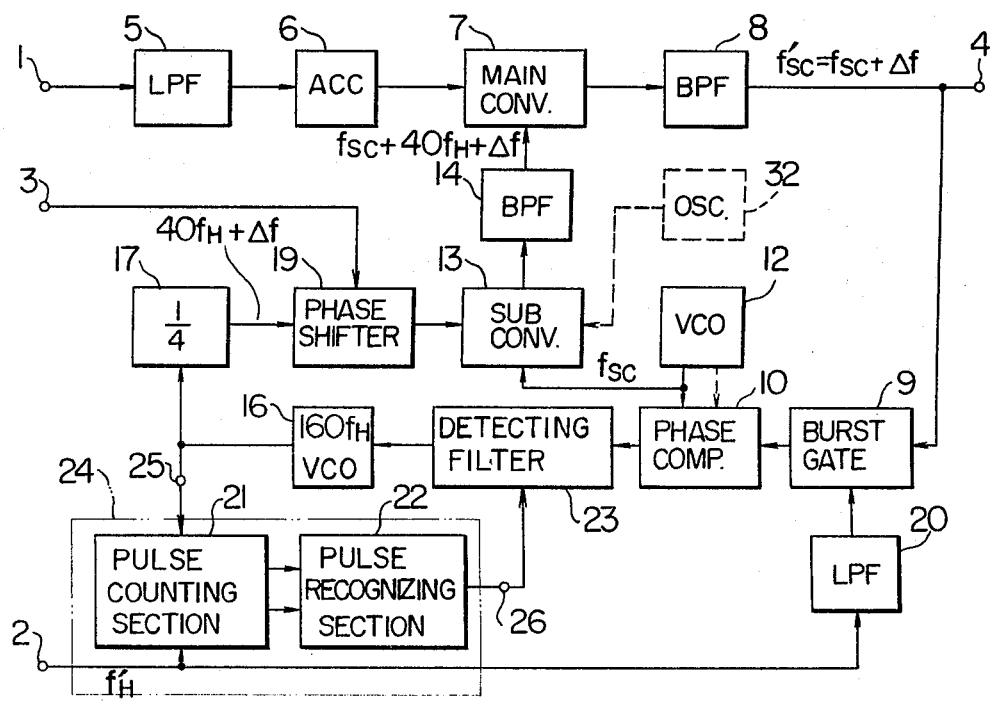
FIG. 2 is a block diagram of a typical embodiment of the chrominance signal reproducing apparatus for color VTR according to this invention.

A typical embodiment of the chrominance signal reproducing apparatus for color VTR, according to this invention will hereinafter be described with reference to FIG. 2. FIG. 2 is a block diagram of the typical embodiment of the chrominance signal reproducing apparatus for color VTR, according to this invention, in which like elements corresponding to those of FIG. 1 are identified by the same reference numerals.

The APC circuit comprises the burst gate circuit 9, the VCO 12 for producing a reference signal of the same frequency as the chrominance carrier frequency $f_{sc}$, the phase comparator 10, a detecting filter 23 and the 160 $f_H$ VCO 16.

The AFC circuit comprises a frequency discriminator 24 including a pulse counting section 21 and a pulse recognizing section 22, the detecting filter 23 and the 160 $f_H$ VCO 16. Thus, the detecting filter 23 and the VCO 16 are both shared by the APC and AFC circuits.

Upon reproduction, in the APC circuit, the VCO 12 is freely run to produce output $f_{sc}$, which is then applied as a reference frequency to the phase comparator 10, where the color burst signal from the burst gate 9 is compared in phase with the reference frequency. The resulting error current corresponding to the phase difference is applied to or flows from the detecting filter 23. The detecting filter 23 supplies to the VCO 16 an error voltage corresponding to the error current for correcting the time base variation in the carrier chrominance signal to thereby control the oscillation frequency. The detecting filter 23 includes a capacitor being charged or discharged by the error current for converting the error current to the error voltage.

The sub converter 13 is supplied with the free running frequency $f_{sc}$ of the VCO 12 in the NTSC system, while in the PAL system the signal of $(f_{sc} + \frac{1}{8} f_H)$ is applied to the converter 13 from an external crystal oscillator 32 instead of the output of the VCO 12 as indicated by a dotted line.

In the AFC circuit, the frequency discriminator 24 operates when the oscillation frequency $f_o$ of the 160 $f_H$ VCO is equal to or lower than $(160-\frac{1}{2}) f_H$ or equal to or higher than $(160+\frac{1}{2}) f_H$, thus supplying an error current for driving the oscillation frequency $f_o$ in the range of $(160-\frac{1}{2}) f_H < f_o < (160+\frac{1}{2}) f_H$, to the detecting filter 23. The detecting filter 23 supplies to the VCO 16 an error voltage corresponding to the error current thereby to drive the oscillation frequency $f_o$ in the frequency range set forth above. This corresponds to the fact that in the NTSC and PAL systems, the frequency deviation from the chrominance subcarrier frequency $f_{sc}$ is driven in the range of $\pm \frac{1}{8} f_H$. Thus, the driving-in range by the APC system and frequency discriminator is $\pm \frac{3}{8} f_H$ about $f_{sc}$ in the NTSC system and $\pm \frac{5}{8} f_H$ thereabout as a margin in the PAL system, so that the 160 $f_H$ VCO is stably operated. In other words, when the output frequency $f'_{sc}$ of the BPF 8 is smaller than $(f_{sc} - \frac{1}{8} f_H)$ or larger than $(f_{sc} + \frac{1}{8} f_H)$, the AFC circuit controls the VCO 16 so that the $f'_{sc}$ is driven in the range of $(f_{sc} - \frac{1}{8} hd H) < f'_{sc} < (f_{sc} + \frac{1}{8} f_H)$.

When the oscillation frequency $f_o$ of the VCO 16 is in the range of $(160-\frac{1}{2}) f_H < f_o < (160+\frac{1}{2}) f_H$, the frequency discriminator 24 produces no output error current, but only the output error current from the APC circuit controls the VCO 16. That is, when the $f'_{sc}$ is in the range of $(f_{sc} - \frac{1}{8} f_H) < f'_{sc} < (f_{sc} + \frac{1}{8} f_H)$, the APC circuit controls the VCO 16 so that $f'_{sc} = f_{sc}$.

When an output error current is produced from each of the frequency discriminator 24 and the APC circuit (i.e. when $f_o \leq (160 - \frac{1}{2}) f_H$ or $f_o \geq (160 + \frac{1}{2}) f_H$), they are superimposed in the detecting filter to control the VCO 16.

The output of the VCO 16 is applied to the ¼-frequency divider 17 where its frequency is divided by 4, and the output of the divider 17 is applied via the phase shifter 19 to the sub converter 13. The output of the phase shifter 19 has the frequency of $40 f_H + \Delta f$ ($\Delta f$ is the sum of the time base variations detected in the APC and AFC circuits). The sub converter 13 produces the difference and sum components of the outputs of the VCO 12 and phase shifter 19 and supplies them to the BPF 14, which then produces only the sum component $(f_{sc} + 40 f_H + \Delta f)$ and supplies it to the main converter 7. Thus, the difference component of the outputs of the main converter 7, or the output of the BPF 8 has a time-base variation removed.

Figure 3:
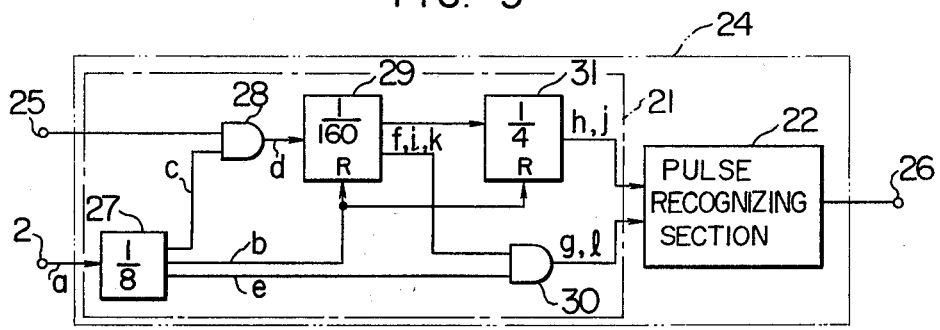
FIG. 3 is a block diagram of the frequency discriminator in FIG. 2.

The circuit operation of the frequency discriminator 24 will be described with reference to FIGS. 3, 4 and 5. In FIG. 3, reference numeral 25 represents a terminal through which a 160-$f_H$ pulse is applied from the VCO 16, to the input terminal to which a reproduced horizontal synchronizing signal is applied, 27 represents a ⅛-frequency divider, 29 represents a 1/160-frequency divider, 31 represents a ¼-frequency divider, and 28 and 30 AND gates with two inputs.

The arrangement as described above shows the pulse counting section of the frequency discriminator 24. In addition, numeral 22 represents the pulse recognizing section and 26 the output terminal.

Figure 4:
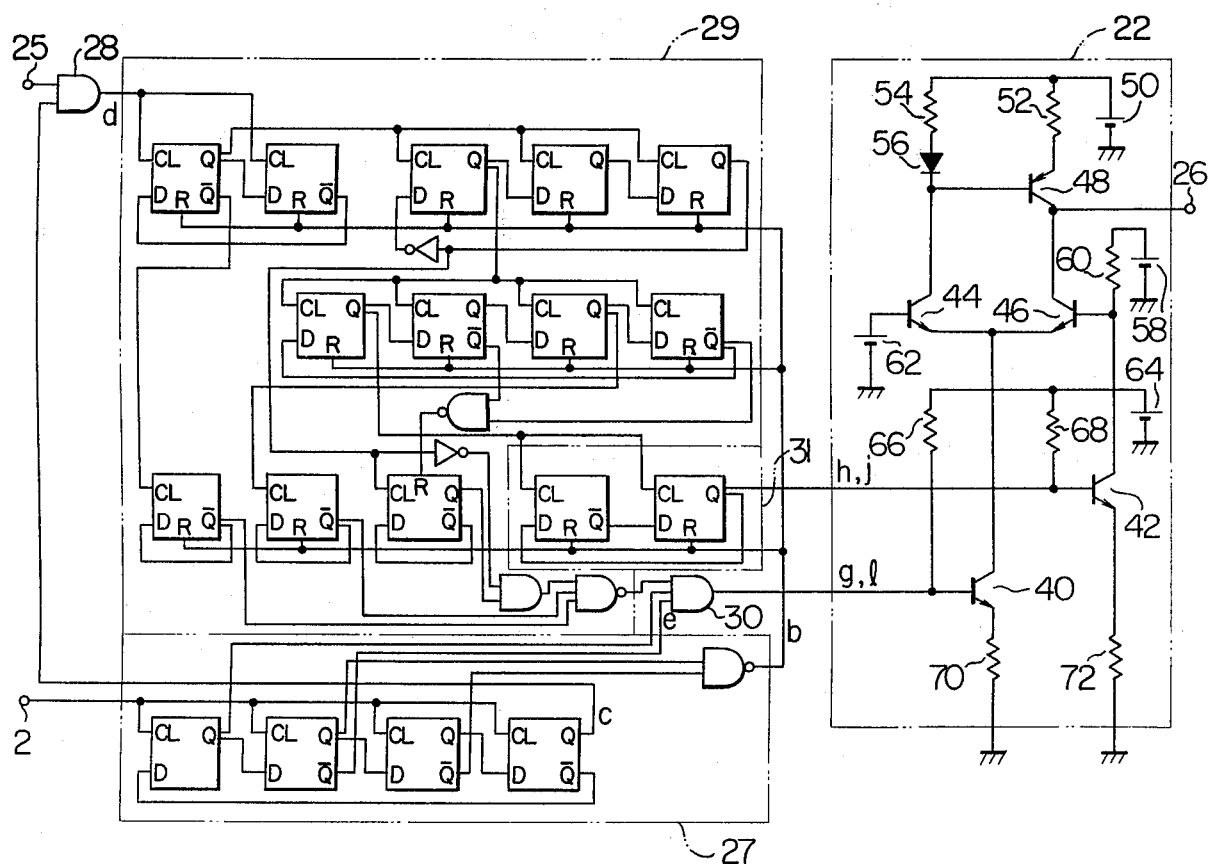
FIG. 4 is a specific circuit diagram of the frequency discriminator of FIG. 3.
Figure 5:
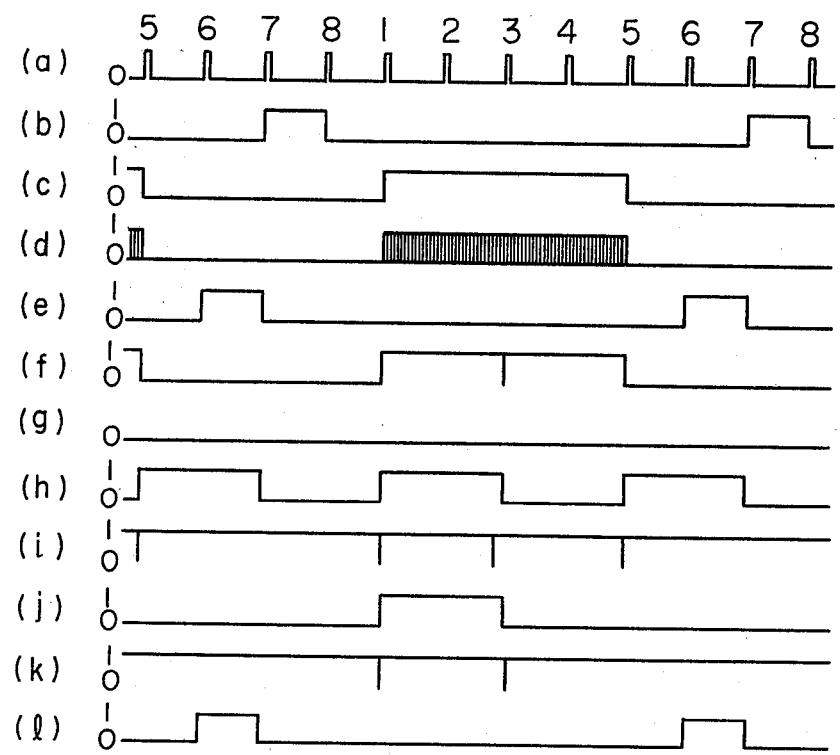
FIG. 5, consisting of a–l, is a timing chart to which reference is made in explaining the operation of the frequency discriminator.

FIG. 4 is a specific circuit diagram of the frequency discriminator 24, and FIG. 5 is a timing chart of each waveform to which reference is made in explaining the operation of the frequency discriminator, In the timing chart of FIG. 5, (a) represents the horizontal synchronizing signal to be applied to the terminal 2, (b) represents the second output signal from the ⅛-frequency divider 27, as a reset signal to the 1/160-frequency divider 29 and ¼-frequency divider 31, (c) represents the first signal from the ⅛-frequency divider 27 which is applied to one input of the AND gate 28. In addition, (d) represents the output signal from the AND gate 28, (e) represents the third output signal from the ⅛-frequency divider 27 which is applied to one input of the AND gate 30, (f) (i) and (k) represents the second output signal from the 1/160-frequency divider 29 in each state, which is applied to the other input of the AND gate, respectively, (g) and (l) the output of the AND gate 30, and (h) and (j) represent the waveform of the output of the ¼-frequency divider 31.

Upon reproduction, the output pulse from the 160 $f_H$ VCO 16 is applied via the input terminal 25 to the frequency discriminator 24, or the AND gate 28 together with the reproduced horizontal synchronizing signal pulse (FIG. 5(c)) frequency-divided by 8 in the ⅛-frequency divider 27. The AND gate 28 thus produces as shown in FIG. 5(d) the first to fifth horizontal synchronizing signals in the 4-H period, of the output pulses from the VCO 16. Then, the 1/160-frequency divider 29 divides the frequency of the pulses in the 4-H period and count. This frequency divider produces a control voltage for controlling $f_o$, depending on the state of the frequency divided output at the completion of the frequency dividing operation. That is, since driving the frequency of the carrier chrominance signal (the output of the BPF 8) in the range of $f_{sc} \pm \frac{1}{8} f_H$ corresponds to driving the output frequency $f_o$ of the 160 $f_H$ VCO 16 in the range of $(160 \pm \frac{1}{2}) f_H$, when the $f_o$ is equal to or lower than $(160 - \frac{1}{2}) f_H$ or the $f_o$ is equal to or higher than $(160 + \frac{1}{2}) f_H$, i.e., when the number of the output pulses from the 160 $f_H$ VCO is 638 or below or 642 or above, the pulse counting section 21 supplies a pulse (FIGS. 5(h), (j)) indicating whether it is higher or lower than 160 $f_H$ and a pulse (FIGS. 5(g), (l)) indicating the amount of the deviation, to the pulse recognizing section 22. These pulses allow the pulse recognizing section 22 to operate to produce a control current for driving the output frequency $f_o$ from the 160 $f_H$ VCO 16 in the range of $(160 \pm \frac{1}{2}) f_H$.

When the otput frequency $f_o$ of the 160 $f_H$ VCO 16 equals to 160 $f_H$, the AND gate 30 produces a low-level output as shown in FIG. 5(g), while when it is unequal to 160 $f_H$, the gate 30 produces a pulse as shown in FIG. 5(e).

When the $f_o$ is equal to or larger than $(160 \pm \frac{1}{2}) f_H$ (i.e., the number of pulses is 642 or above), the output of the ¼-frequency divider 31 in the pulse counting section 21 is at high level in the period between the leading edges of the fifth to seventh horizontal synchronizing signals as shown in FIG. 5(h). At this time, the AND gate 30 produces high level outputs in the period between the leading edges of the sixth to seventh horizontal synchronizing pulses as shown in FIG. 5(e). Therefore, as described later, during the period between the leading edges of the sixth to seventh horizontal synchronizing pulses, the pulse recognizing section 22 supplies a current via the output terminal 26 to the detecting filter 23, thus increasing the output voltage from the detecting filter 23, or the control voltage from the VCO 16 to thereby lowering the oscillation frequency $f_o$.

When the $f_o$ is equal to or lower than $(160-\frac{1}{2}) f_H$ (the number of pulses is 638 or below), the $\frac{1}{4}$-frequency divider 31 produces output as shown in FIG. 5(j) and is at low level while the output (FIG. 5(e)) of the AND gate 30 is at high level, or during the period between the leading edges of the sixth to seventh horizontal synchronizing pulses. As a consequence, a current from the detecting filter 23 flows into the output terminal 26 of the pulse recognizing section 22, decreasing the output voltage of the detecting filter 23, or the control voltage to the 160 $f_H$ VCO 16 causing $f_o$ to increase.

The circuit construction and operation of the pulse recognizing section 22 in FIG. 3 will be described with reference to FIG. 4.

When the output of the AND gate 30 is first assumed to be at low level, a transistor 40 is turned off to cause transistors 44 and 46 to be nonconductive, so that current does not flow to the terminal 26 independent of the output of the $\frac{1}{4}$-frequency divider 31.

When the output of the AND gate 30 is at high level, the transistor 40 is turned on, allowing the transistors 44 and 46 to be conductive since they are biased by DC power sources 62 and 58, respectively. Under this condition, when the output of the $\frac{1}{4}$-frequency divider 31 in at high level, a transistor 42 becomes conductive, and thus the transistor 46 is biased by the voltage of the DC power supply 58 divided by resistors 60 and 72, but this biasing potential of the transistor 46 is set to be lower than that of the transistor 44. Consequently, the collector current of the transistor 46 becomes smaller and so the collector current of the transistor 48 flows to the terminal 26.

On the other hand, when the output of the AND gate 30 is at high level and when the output of the divider 31 is at low level, the transistor 42 is turned off permitting the base biasing voltage to the transistor 46 to increase to be larger than that of the transistor 44. As a result, the collector current of the transistor 46 increases such that currents are flow from the collector of the transistor 48 and from the detecting filter 23 via the terminal 26 to the collector of the transistor 46.

In accordance with this invention, as described above, when the oscillation frequency $f_o$ of the 160 $f_H$ VCO, which is controlled by both of the error control signal from the APC and AFC circuits, is equal to or lower than $(160-\frac{1}{2}) f_H$ or equal to or higher than $(160+\frac{1}{2}) f_H$, the frequency discriminator, i.e. AFC circuit, controls the $f_o$ to be driven in the range of $(160-\frac{1}{2}) f_H < f_o < (160+\frac{1}{2}) f_H$. In addition, when the $f_o$ is in the range of $(160-\frac{1}{2}) f_H < f_o < (160+\frac{1}{2}) f_H$, the APC circuit controls the $f_o$ to be driven equal to 160 $f_H$ only with the aid of the phase information of the burst signal. Thus, this fact can apply to the NTSC and PAL systems. Moreover, color reproduction error caused by the distortion of horizontal synchronizing signal due to the luminance signal contents in the long time mode, which has been difficult to remove so far, can be prevented from occuring because the phase information of the horizontal synchronizing signal is not used.

We claim:

1. A chrominance signal reproducing apparatus comprising:
   a reproduced-video signal input terminal;
   a low-pass filter connected to said input terminal to produce a low-frequency converted carrier chrominance signal;
   a first voltage-controlled oscillator oscillating at a first frequency;
   a second voltage-controlled oscillator oscillating at a second frequency;
   a frequency divider for dividing the output frequency of said first voltage-controlled oscillator;
   a sub frequency converter circuit for producing the sum of the output frequencies of said frequency divider and said second voltage-controlled oscillator;
   a main frequency converter circuit for frequency-converting the low-frequency converted carrier chrominance signal from said low-pass filter to produce a difference component, by the application of the sum frequency from the sub frequency converter circuit;
   a burst gate supplied with the difference component from the main frequency converter circuit to produce a color burst signal;
   a phase comparator for comparing the phases of the outputs from said burst gate and said second voltage-controlled oscillator to supply a phase difference signal to said first voltage-controlled oscillator, thus controlling its oscillation frequency; and
   a frequency discriminator for counting the output frequency of said first voltage-controlled oscillator for a predetermined time and applying a control voltage to said first voltage-controlled oscillator, depending on the count value;
   said frequency discriminator operating only when the frequency of the frequency converted carrier chrominance signal from said main frequency converter is deviated $\pm\frac{1}{8} f_H$ wherein $f_H$ horizontal synchronizing frequency or above with respect to the carrier chrominance signal, to apply a control voltage to said first voltage-controlled oscillator thereby driving the deviation in the range of $\pm\frac{1}{8} f_H$.

2. A chrominance signal reproducing apparatus according to claim 1, wherein said first voltage-controlled oscillator oscillates at 160 fH, said frequency divider is a $\frac{1}{4}$-frequency divider, and said frequency discriminator counts the output pulses from said first voltage-controlled oscillator for 4-H period wherein 4-H equals four horizontal scanning periods, in which case, when the number of counted pulses is equal to or smaller than 638, it supplies a control voltage to said first voltage-controlled oscillator to increase the oscillation frequency $f_o$, while when the number is equal to or larger than 642, it applies a control voltage to said first voltage-controlled oscillator to lower the frequency $f_o$.

3. A chrominance signal reproducing apparatus according to claim 2, further comprising a crystal oscillator, wherein upon reproduction of a video signal of NTSC system, said second voltage-controlled oscillator is freely running to supply its output frequency to said sub frequency converter and said phase comparator while upon reproduction of a PAL-system video signal, said crystal oscillator supplies its output frequency thereto.

4. A chrominance signal correction circuit comprising:
   (a) a source of chrominance signal having a time base error;
   (b) frequency converter means for mixing the chrominance signal with a correction signal to eliminate the time base error within the chrominance signal to produce a corrected chrominance signal;
   (c) means for generating the correction signal having inputs of a first component which is responsive to phase deviation of a color burst signal contained in the corrected chrominance signal from the phase of a first local oscillator and a second component which is responsive to deviation in frequency between the frequency of oscillation of a second variable frequency local oscillator and a reference frequency during a reference time interval;
   (d) the frequency of oscillation of the second variable frequency local oscillator being responsive to the inputs of the means for generating, the correction signal being applied to the frequency converter means to mix the correction signal with the chrominance signal to eliminate the time base error; and
   (e) the first component of the correction signal being effective to vary the frequency of the second local oscillator only when the frequency of the second local oscillator falls within a predetermined frequency range and being ineffective to vary the frequency of the second local oscillator when the frequency of oscillation of the second local oscillator falls outside the predetermined frequency range and the second component of the correction signal being effective to vary the frequency of the second local oscillator only when the first component is ineffective to vary the frequency of the second local oscillator.

5. A chrominance signal correction circuit in accordance with claim 4 wherein the frequency of the chrominance signal is within $\pm \frac{1}{8} f_H$ of the frequency of the correction signal when the first component is effective wherein $f_H$ equals the horizontal synchronizing frequency.

6. A chrominance signal correction circuit in accordance with claim 4 wherein the second component of the correction signal is generated by frequency discriminating means which counts the number of cycles of the frequency of the second variable frequency local oscillator during four consecutive horizontal line intervals.

7. A chrominance signal correction circuit in accordance with claim 6 wherein the means for generating the correction signal comprises
   (a) a frequency dividing means coupled to an output of the second local oscillator;
   (b) a phase shifting means coupled to an output of the frequency dividing means which is responsive to a signal obtained by reproducing a vertical synchronizing signal to either advance or retard the phase of the output signal of the frequency dividing means as a function of which one of two recorded tracks is reproduced;
   (c) a mixing means having a first input coupled to the output of the phase shifting means and a second input coupled to an output of the first local oscillator producing an output which contains sum and difference components of the output of the first local oscillator and the output of the phase shifting means; and
   (d) band pass filter means having an input coupled to the output of the mixing means and an output coupled to the frequency converting means.

* * * * *